US012407077B2

(12) United States Patent
Tu et al.

(10) Patent No.: US 12,407,077 B2
(45) Date of Patent: Sep. 2, 2025

(54) MULTI-BAND FILTER

(71) Applicant: QuantumZ Inc., Kaohsiung (TW)

(72) Inventors: Kun Yen Tu, Kaohsiung (TW); Meng-Hua Tsai, Kaohsiung (TW); Weiting Lee, Kaohsiung (TW); Sin-Siang Wang, Kaohsiung (TW)

(73) Assignee: QuantumZ Inc., Kaohsiung (TW)

( * ) Notice: Subject to any disclaimer, the term of this patent is extended or adjusted under 35 U.S.C. 154(b) by 287 days.

(21) Appl. No.: 18/338,322

(22) Filed: Jun. 20, 2023

(65) Prior Publication Data

US 2024/0097300 A1 Mar. 21, 2024

(30) Foreign Application Priority Data

Sep. 15, 2022 (TW) ................................. 111134823

(51) Int. Cl.
*H01P 1/203* (2006.01)
*H01P 1/205* (2006.01)
*H01P 1/213* (2006.01)

(52) U.S. Cl.
CPC ............ *H01P 1/2135* (2013.01); *H01P 1/203* (2013.01); *H01P 1/20381* (2013.01); *H01P 1/205* (2013.01)

(58) Field of Classification Search
CPC .. H01P 1/203; H01P 1/20; H01P 1/201; H01P 1/20327; H01P 1/20336; H01P 1/20345; H01P 1/205; H01P 1/2135; H01P 1/20381
See application file for complete search history.

(56) References Cited

U.S. PATENT DOCUMENTS 6,958,729 B1 * 10/2005 Metz ........................ H01Q 3/26 343/753
7,795,995 B2 * 9/2010 White .................... H05K 1/024 333/204
2014/0176263 A1 * 6/2014 Giraudo .............. H03H 7/0138 333/205

* cited by examiner

*Primary Examiner* — Stephen E. Jones
(74) *Attorney, Agent, or Firm* — CKC & Partners Co., LLC

(57) ABSTRACT

A multi-band filter includes a circuit board, a first resonator, a second resonator, and a coupling element configured to couple the first resonator with the second resonator. The coupling element includes a first coupling capacitor, a second coupling capacitor, a first short-circuited stub and a second short-circuited stub. The first coupling capacitor has two terminals electrically connected to the first portion of the first resonator and the first portion of the second resonator respectively. The second coupling capacitor has two terminals electrically connected to the second portion of the first resonator and the second portion of the second resonator respectively. The first short-circuited stub is electrically connected to the first coupling capacitor and a ground plane. The second short-circuited stub is electrically connected to the second coupling capacitor and a ground plane.

15 Claims, 10 Drawing Sheets

MULTI-BAND FILTER

RELATED APPLICATIONS

This application claims priority to Taiwan Application Ser. No. 111134823, filed Sep. 15, 2022, which is herein incorporated by reference.

BACKGROUND

Field of Invention

The present invention relates to a multi-band filter.

Description of Related Art

With the rapid advancement of technology in recent years, electronic products such as PCs, tablet PCs, NBs, and smartphones have become indispensable in our daily lives. These devices incorporate various radio frequencies to cater to the diverse demands of users, and filters are commonly used to eliminate unwanted signal components within specific frequency bands. However, when it comes to the millimeter wave frequency band, traditional filters suffer from higher signal loss and require larger circuit areas. Consequently, there is a pressing need for a new type of filter that can effectively address these challenges and offer improved performance in millimeter wave frequency bands.

SUMMARY

Embodiments of the present invention provide a multi-band filter capable of filtering and outputting plural frequency bands. The multi-band filter in the embodiments of the present invention has less loss and also has a small circuit area.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

Figure 1:
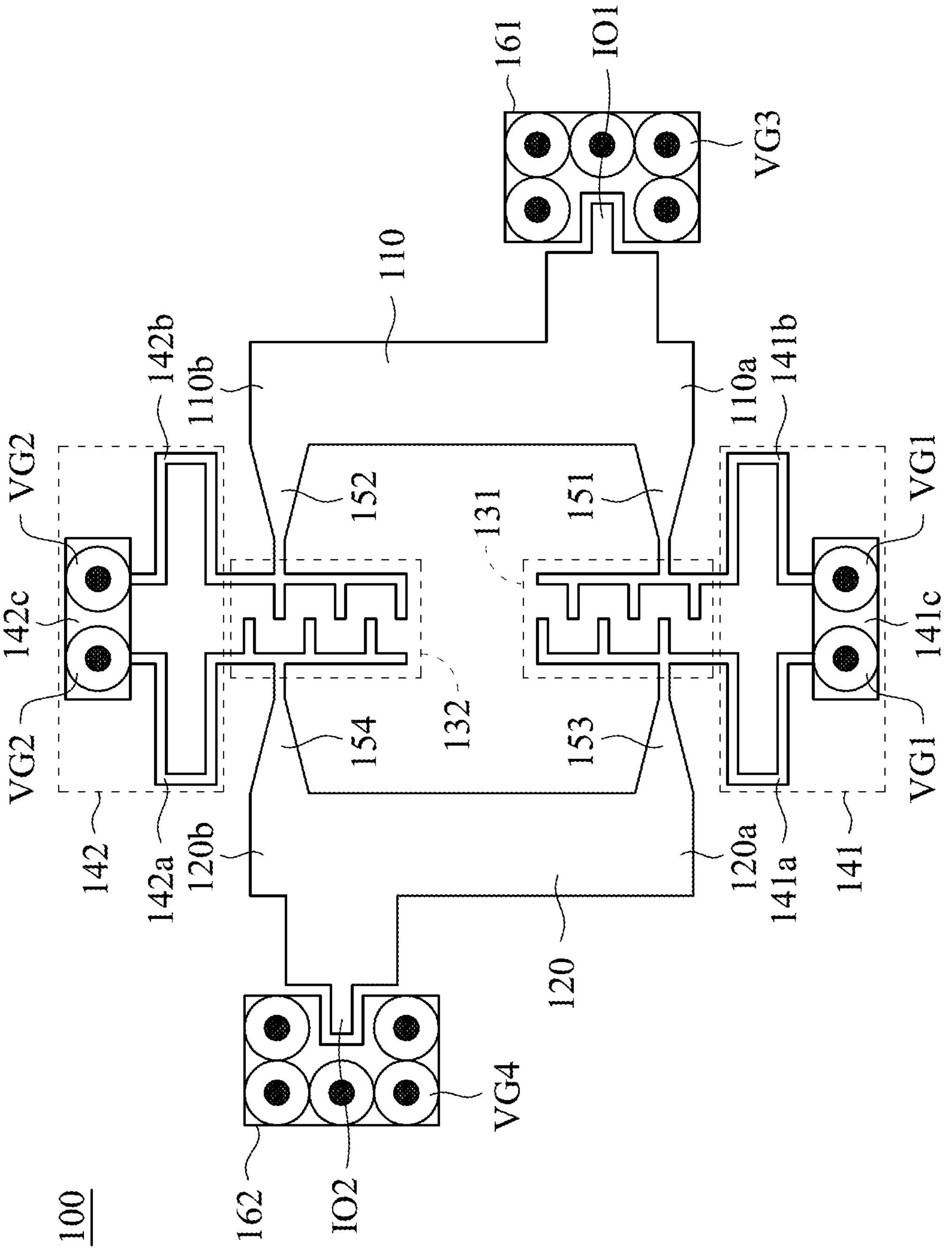
FIG. 1 is a schematic diagram showing a structure of a multi-band filter in accordance with an embodiment of the present invention.

The using of "first", "second", "third", etc. in the specification should be understood for identifying units or data described by the same terminology but are not referred to particular order or sequence. FIG. 1 is a schematic diagram showing a structure of a multi-band filter 100 in accordance with an embodiment of the present invention. The multi-band filter 100 is disposed in a circuit layer of a circuit board to provide plural frequency bands. In this embodiment, the multi-band filter 100 is disposed on a substrate made of liquid crystal polymer (LCP), but other embodiments of the present invention are not limited thereto. For example, polyimide (PI) or modified PI (MPI) is common material used for the substrate. The multi-band filter 100 includes a first resonator 110, a second resonator 120 and a coupling element located therebetween. The coupling element includes a first coupling capacitor 131, a second coupling capacitor 132, a first short-circuited stub 141 and a second short-circuited stub 142. I/O terminals 101 and 102 of the multi-band filter 100 are respectively located at the first resonator 110 and the second resonator 120 to receive/output an electric signal. For example, an electric signal desired to be filtered may be inputted to the multi-band filter 100 through the I/O terminal IO1, and then a filtered electric signal is outputted through the I/O terminal IO2.Vise versa, the electric signal desired to be filtered may be inputted to the multi-band filter 100 through the I/O terminal 102, and then the filtered electric signal is outputted through the I/O terminal 101. In this embodiment, a zero-degree feed structure is applied for the electric signal to improve performance of stop bands, but other embodiments of the present invention are not limited thereto. In this embodiment, the electric signal is in millimeter wave range, and the multi-band filter 100 provides 28 GHz and 39 GHz frequency bands simultaneously. For example a frequency band from 26.13 GHz to 28.55 GHz and a frequency band from 37.56 GHz to 41.25 GHz. However, other embodiments of the present invention are not limited thereto.

The first resonator 110 has a first portion 110*a* and a second portion 110*b* opposite to each other. The first portion 110*a* of the first resonator 110 is electrically connected to the first coupling capacitor 131, and the second portion 110*b* of the first resonator 110 is electrically connected to the second coupling capacitor 132. The second resonator 120 has a first portion 120*a* and a second portion 120*b* opposite to each other. The first portion 120*a* of the second resonator 120 is electrically connected to the first coupling capacitor 131, and the second portion 120*b* of the second resonator 120 is electrically connected to the second coupling capacitor 132.

In order to match a high frequency band, the first resonator 110 is electrically connected to the first coupling capacitor 131 and the second coupling capacitor 132 through a first funnel-shaped connecting path 151 and a second funnel-shaped connecting path 152. The second resonator 120 is electrically connected to the first coupling capacitor 131 and the second coupling capacitor 132 through a third funnel-shaped connecting path 153 and a fourth funnel-shaped connecting path 154. The first funnel-shaped connecting path 151 is disposed between the first portion 110*a* of the first resonator 110 and the first coupling capacitor 131 to provide electric connection therebetween. The second funnel-shaped connecting path 152 is disposed between the second portion 110*b* of the first resonator 110 and the second coupling capacitor 132 to provide electric connection therebetween. The third funnel-shaped connecting path 153 is disposed between the first portion 120*a* of the second resonator 120 and the first coupling capacitor 131 to provide electric connection between the second resonator 120 and the first coupling capacitor 131. The fourth funnel-shaped connecting path 154 is disposed between the second portion 120*b* of the second resonator 120 and the second coupling capacitor 132 to provide electric connection therebetween.

The first funnel-shaped connecting path 151 includes an escalating path. As shown in FIG. 1, the wider path portion is directly connected to the first portion 110*a* of the first resonator 110, and the narrower path portion is directly connected to the first coupling capacitor 131. Similarly, the second funnel-shaped connecting path 152 includes an escalating path. As shown in FIG. 1, the wider path portion is directly connected to the second portion 110*b* of the first resonator 110, and the narrower path portion is directly connected to the second coupling capacitor 132. Similarly, the third funnel-shaped connecting path 153 includes an escalating path. As shown in FIG. 1, the wider path portion is directly connected to the first portion 120*a* of the second resonator 120, and the narrower path portion is directly connected to the first coupling capacitor 131. Similarly, the fourth funnel-shaped connecting path 154 includes an escalating path. As shown in FIG. 1, the wider path portion is directly connected to the second portion 120*b* of the second resonator 120, and the narrower path portion is directly connected to the second coupling capacitor 132.

In some embodiments, the first resonator 110 and the second resonator 120 are half-wave resonators.

In the embodiments of the present invention, the first coupling capacitor 131 and the second coupling capacitor 132 are interdigital capacitors respectively having a plurality of fingers. In this embodiment, the first coupling capacitor 131 and the second coupling capacitor 132 respectively have six fingers, and a length of each of the fingers is substantially equal to 135 um, but embodiments of the present invention are not limited thereto. In other embodiments of the present invention, the number of the fingers and the length of each fingers may be adjusted in accordance with actual demands to adjust bandwidths of passbands of the multi-band filter 100.

The first short-circuited stub 141 and the second short-circuited stub 142 are electrically connected to the first coupling capacitor 131 and the second coupling capacitor 132. The lengths of the first short-circuited stub 141 and the second short-circuited stub 142 may be adjusted to adjust a bandwidth of a high frequency band. In this embodiment, the first short-circuited stub 141 and the second short-circuited stub 142 are designed to have plural bending portions and a short-circuited pattern directly connected thereto to decrease the planar area occupied by the multi-band filter 100. For example, the first short-circuited stub 141 includes bending portions 141*a* and 141*b* and a short-circuited pattern 141*c*, where the short-circuited pattern 141*c* is electrically grounded trough vias VG1. The second short-circuited stub 142 includes bending portions 142*a* and 142*b* and a short-circuited pattern 142*c*, in which the short-circuited pattern 142*c* is electrically grounded trough vias VG2.

In some embodiments of the present invention, the multi-band filter 100 may be divided into several filter portions and disposed in different layers in a multi-layer circuit board for decreasing surface area occupied by the multi-band filter 100.

In some embodiments, U-shaped grounded patterns 161, 162 are arranged for the convenience of testing, in which the I/O terminals 101, 102 are respectively surrounded by the U-shaped grounded patterns 161, 162. When a testing is performed, a testing equipment is electrically connected to the I/O terminals 101/102 and corresponding U-shaped grounded pattern 161/162 to enable signal conduction for performing the testing operation. For example, the I/O terminals 101/102 are grounded to perform tests and acquire parameters of the multi-band filter 100. The elongated U-shaped patterns 161, 162 allow multiple testing points, thereby decreasing deviation occurred when performing the testing operation on a single point. In this embodiment, the U-shaped grounded patterns 161, 162 are grounded through vias VG3 and VG4 respectively.

Figure 2:
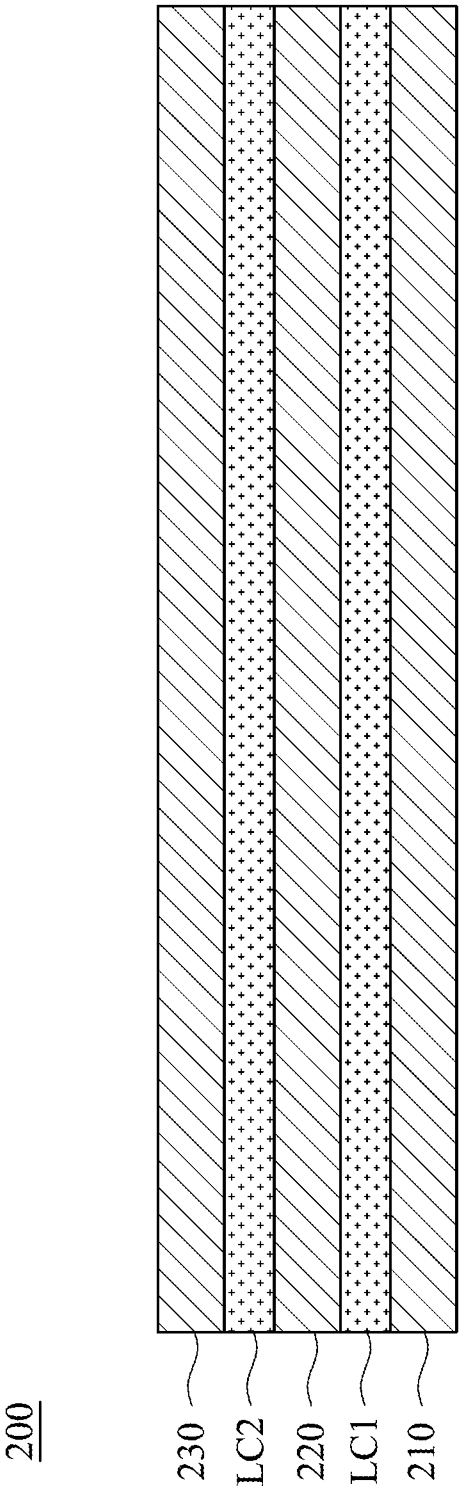
FIG. 2 is a schematic diagram showing a structure of a multi-layer circuit board in accordance with an embodiment of present invention.
Figure 3:
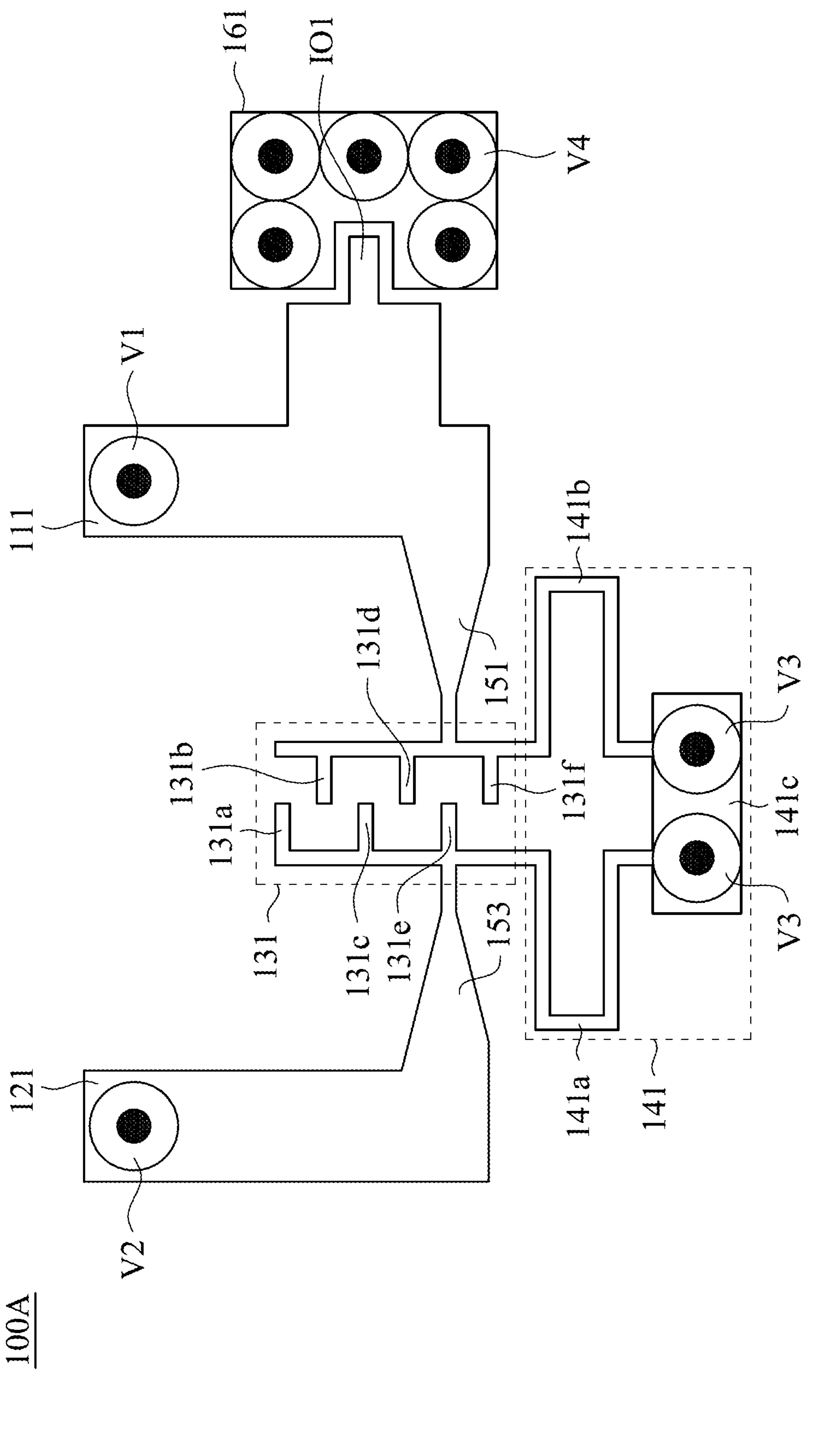
FIGS. 3-5 are schematic diagram showing a structure of a multi-band filter disposed in the multi-layer circuit board.
Figure 4:
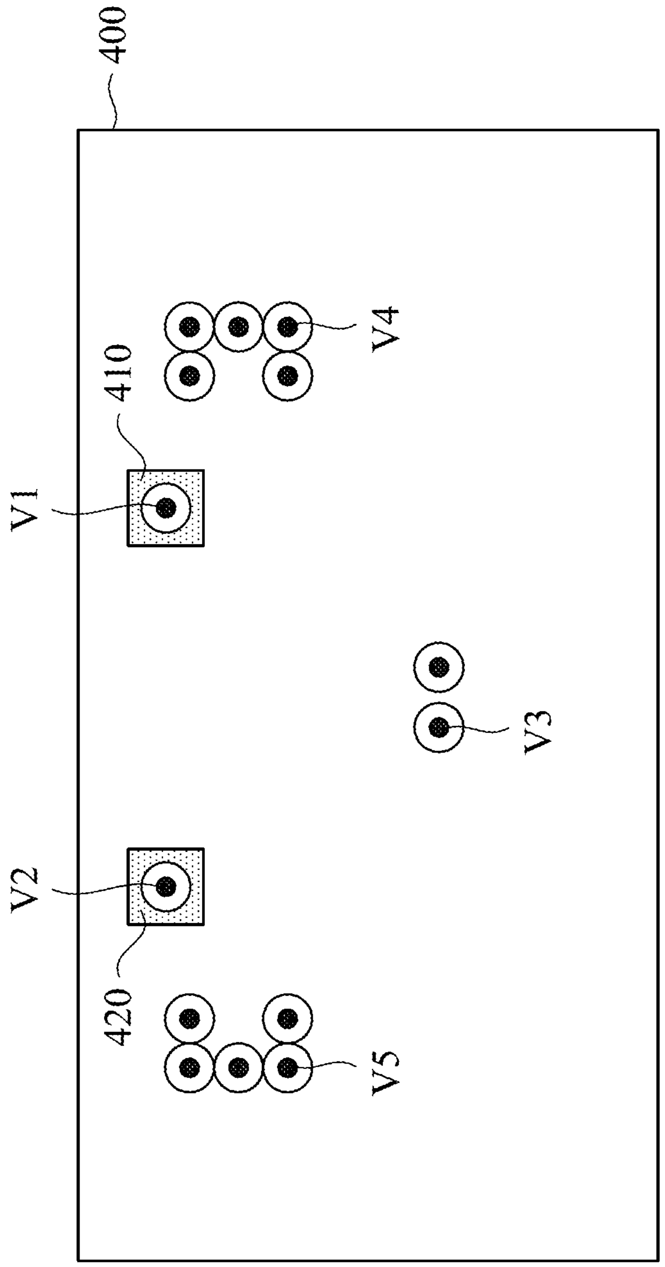
Figure 5:
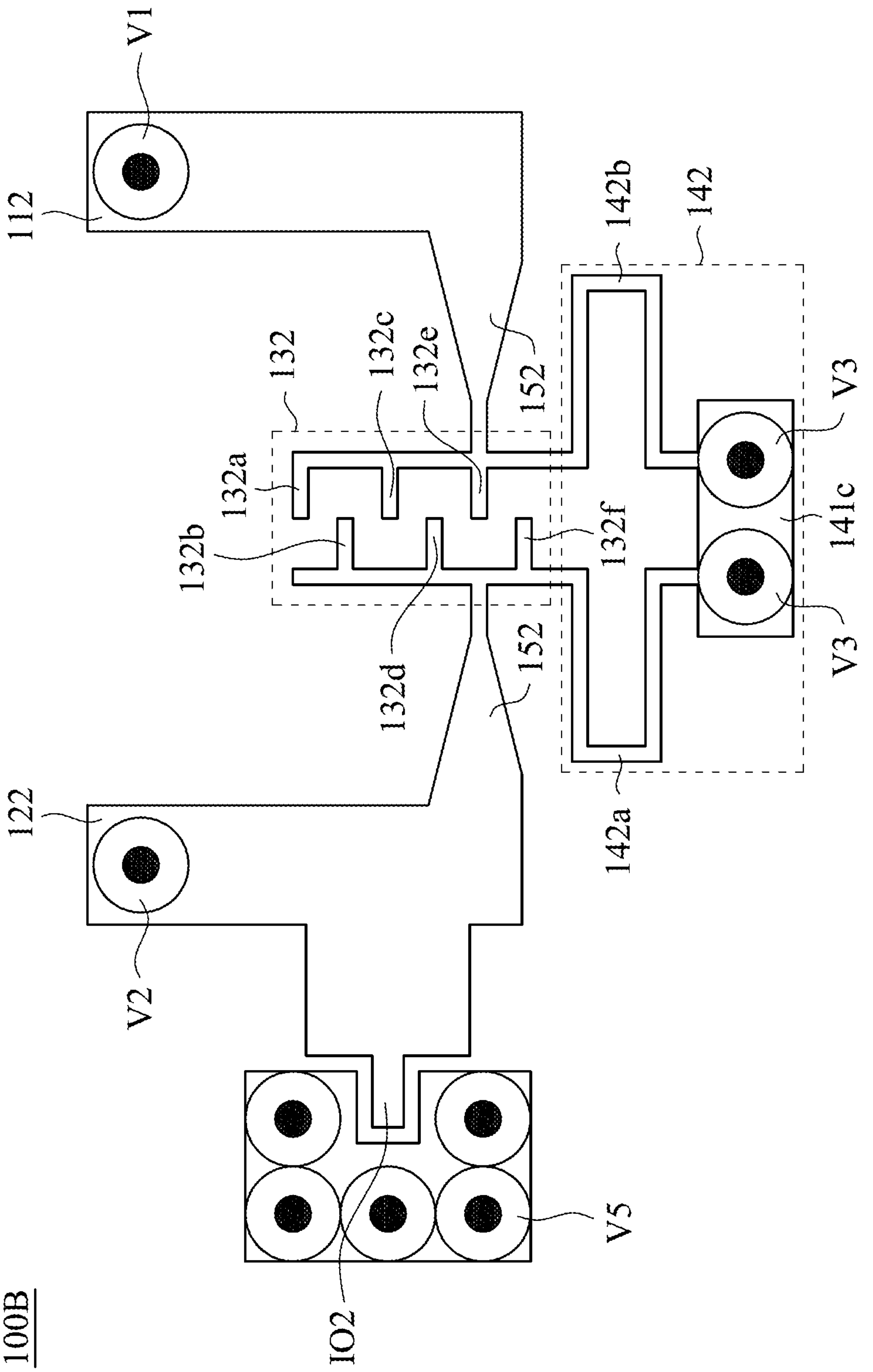

Referring to FIGS. 2-5, FIG. 2 is a schematic diagram showing a structure of a multi-layer circuit board 200 in accordance with an embodiment of present invention, and FIGS. 3-5 are schematic diagram showing a structure of a multi-band filter disposed in the multi-layer circuit board 200. As shown in FIG. 2, the multi-layer circuit board 200 includes at least three layers. In this embodiment, the multi-layer circuit board 200 includes a first circuit layer 210, a second circuit layer 220, a third circuit layer 230, a first insulation layer LC1 and a second insulation layer LC2. In the multi-layer circuit board 200, the second circuit layer 220 is disposed on the first circuit layer 210, and the third circuit layer 230 is disposed on the second circuit layer 220, and thus the second circuit layer 220 is disposed between the first circuit layer 210 and the third circuit layer 230. The first insulation layer LC1 is disposed between the first circuit layer 210 and the second circuit layer 220 to provide electrical insulation between the first circuit layer 210 and the second circuit layer 220. The second insulation layer LC2 is disposed between the second circuit layer 220 and the third circuit layer 230 to provide electrical insulation between the second circuit layer 220 and the third circuit layer 230. In this embodiment, the multi-layer circuit board 200 is a flexible circuit board, and the first insulation layer LC1 and the second insulation layer LC2 are made from liquid crystal polymer (LCP), but embodiments of the present invention are not limited thereto. For example, polyimide (PI) or modified PI (MPI) is common material used for the insulation material.

The multi-band filter 100 is divided into two portions 100A and 100B respectively disposed in the first circuit layer 210 and the third circuit layer 230, as shown in FIG. 3 and FIG. 5. The second circuit layer 220 includes a grounded layer 400 to provide a common ground plane for the filter portions 100A and 100B.

Referring to FIG. 3, the filter portion 100A is disposed in the first circuit layer 210 and includes a first portion 111 of the first resonator 110 (the first resonator 110 shown in FIG. 1), a first portion 121 of the second resonator 120 (the second resonator 120 shown in FIG. 1), the first funnel-shaped connecting path 151, the third funnel-shaped connecting path 153, the first coupling capacitor 131 and the first short-circuited stub 141. In this embodiment, an area of the first portion 111 of the first resonator 110 is a half of an area of the first resonator 110, and an area of the first portion 121 of the second resonator 120 is a half of an area of the second resonator 120, but embodiments of the present invention are not limited thereto.

Referring to FIG. 5, the filter portion 100B is disposed in the third circuit layer 230 and includes a second portion 112 of the first resonator 110 (the first resonator 110 shown in FIG. 1), a second portion 122 of the second resonator 120 (the second resonator 120 shown in FIG. 1), the funnel-shaped connecting path 152, the fourth funnel-shaped connecting path 154, the second coupling capacitor 132 and the second short-circuited stub 142. In this embodiment, an area of the second portion 112 of the first resonator 110 is a half of an area of the first resonator 110, and an area of the second portion 122 of the second resonator 120 is a half of an area of the second resonator 120, but embodiments of the present invention are not limited thereto. In other embodiments of the present invention, other area ratios can be applied. For example, in one embodiment, the area of the first portion 111 of the first resonator 110 is one-third of the area of the first resonator 110, and the area of the second portion 112 of the first resonator 110 is two-third of the area of the first resonator 110. Similarly, the area of the first portion 121 of the second resonator 120 is one-third of the area of the second resonator 120, and the area of the second portion 122 of the second resonator 120 is two-third of the area of the second resonator 120.

Referring to FIGS. 3-5 simultaneously, in order to electrically connect the filter portion 100A with the filter portion 100B, the filter portion 100A located in the first circuit layer 210 and the filter portion 200B in the third circuit layer 230 are partially overlapped, and thus vertical vias may be used to electrically connect the filter portion 100A with the filter portion 100B. Further, for convenience of grounding, also the grounded layer 400 is disposed between the filter portion 100A located in the first circuit layer 210 and the filter portion 200B in the third circuit layer 230.

For example, a via V1 is disposed to vertically pass through the first circuit layer 210, the second circuit layer 220, the third circuit layer 230, the first insulation layer LC1 and the second insulation layer LC2, to electrically connect the first portion 111 of the first resonator 110 with the second portion 112 of the first resonator 110. The via V1 may pass though the grounded layer 400 in the second circuit layer 220. To avoid that the via V1 contacts the grounded layer 400 in the second circuit layer 220, the second circuit layer 220 includes an insulation portion 410 surrounding the via V1 in the second circuit layer 220 for electrical isolation between the via V1 and the grounded layer 400.

For another example, a via V2 is disposed to vertically pass through the first circuit layer 210, the second circuit layer 220, the third circuit layer 230, the first insulation layer LC1 and the second insulation layer LC2, to electrically connect the first portion 121 of the second resonator 120 with the second portion 122 of the second resonator 120. The via V2 may pass though the grounded layer 400 in the second circuit layer 220. To avoid that the via V2 contacts the grounded layer 400 in the second circuit layer 220, the second circuit layer 220 includes an insulation portion 420 surrounding the via V2 in the second circuit layer 220 for electrical isolation between the via V2 and the grounded layer 400.

For still another example, vias V3 are disposed to vertically pass through the first circuit layer 210, the second circuit layer 220, the third circuit layer 230, the first insulation layer LC1 and the second insulation layer LC2, to electrically connect the first short-circuited stub 141 with the second short-circuited stub 142. The vias V3 may pass though the grounded layer 400 in the second circuit layer 220. Because it is necessary to ground the first short-circuited stub 141 and the second short-circuited stub 142, vias V3 are electrically connected to the grounded layer 400 in the second circuit layer 220 to achieve the grounding of the first short-circuited stub 141 and the second short-circuited stub 142. In addition, vias V4 are disposed to vertically pass through the first circuit layer 210, the second circuit layer 220, the third circuit layer 230, the first insulation layer LC1 and the second insulation layer LC2, to electrically connect the U-shaped grounded pattern 161 with the grounded layer 400 in the second circuit layer 220. Vias V5 are disposed to vertically pass through the first circuit layer 210, the second circuit layer 220, the third circuit layer 230, the first insulation layer LC1 and the second insulation layer LC2, to electrically connect the U-shaped grounded pattern 162 with the grounded layer 400 in the second circuit layer 220.

It can be understood from the above descriptions that the multi-band filter 100 is divided into the filter portion 100A and the filter portion 100B, and the filter portion 100A and the filter portion 100B are disposed in different circuit layers of the multi-layer circuit board 200. Through such design, a planar area occupied by the multi-band filter 100 can be significantly reduced. In addition, the lengths of the fingers of the first coupling capacitor 131 and the second coupling capacitor 132 may vary corresponding to the above design. As shown in FIG. 3, the lengths of the six fingers 131*a* to 131*f* of the first coupling capacitor 131 are respectively equal to 140 um. Also, the lengths of the six fingers 132*a*-132*f* of the second coupling capacitor 132 are respectively equal to 140 um.

Figure 6:
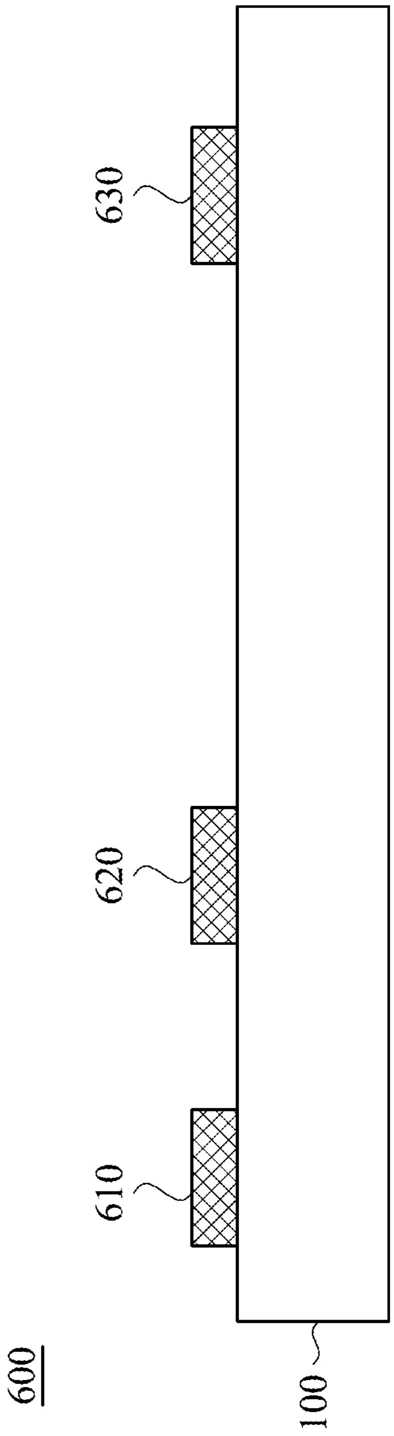
FIG. 6 is a schematic diagram showing a structure of an antenna module in accordance with an embodiment of the present invention.
Figure 7:
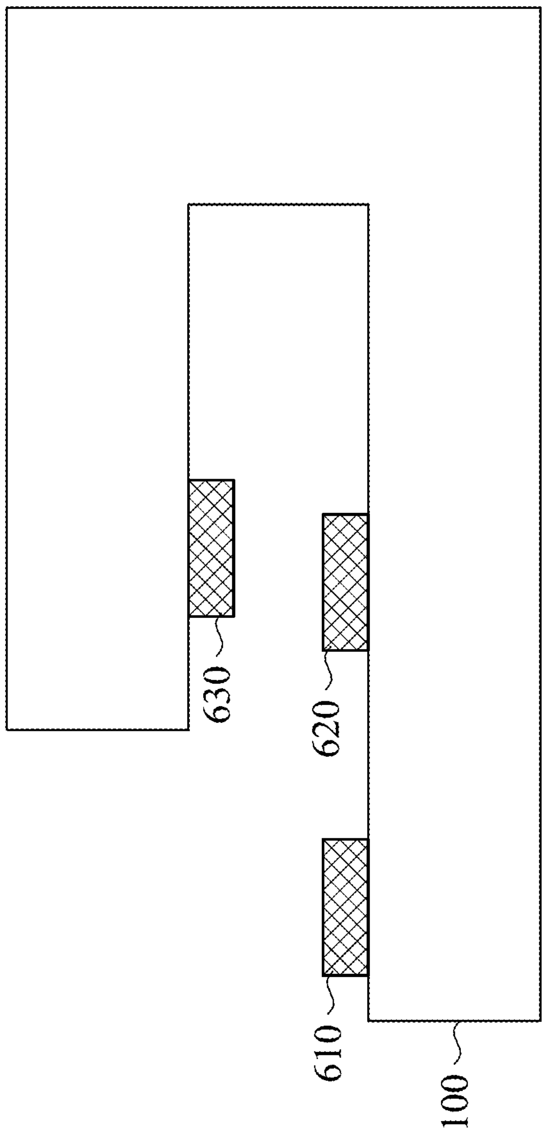
FIG. 7 is a schematic diagram showing a structure of an antenna module after being bent in accordance with an embodiment of the present invention.

Referring to FIG. 6, FIG. 6 is a schematic diagram showing a structure of an antenna module 600 in accordance with an embodiment of the present invention. The antenna module 600 includes a circuit board PCB, a radio frequency chip (RF IC) 610, and antenna devices 620 and 630. The circuit board PCB may be a single-layer circuit board including the multi-band filter 100 or a multi-layer circuit board (for example, the above multi-layer circuit board 200) including the multi-band filter 100. The radio frequency chip 610 and the antenna devices 620, 630 are electrically connected to the multi-band filter 100 in the multi-layer circuit board 200, to use the multi-band filter 100 to filter out unnecessary frequency bands. In this embodiment, technology of antenna in packaging (AiP) is used for packaging of the antenna module 600. Comparing to conventional technology of system in package (SiP), the antenna packaging of this embodiment further integrate the antenna devices, and has a smaller size. For example, in this embodiment, the frequency chip 610 and the antenna devices 620, 630 are disposed on the same surface of the multi-layer circuit board 200. After the antenna module 600 is bent, such design may reduce the space occupied by the antenna module 600, as shown in FIG. 7. After the antenna module 600 is bent, the frequency chip 610 and the antenna devices 620, 630 are located on the inner side of the antenna module 600, and thus the space occupied by the antenna module 600 is significantly decreased. In some embodiments, circuits of the circuit board can be used to form antenna devices, and thus the antenna devices 620, 630 can be omitted and the space occupied by the antenna module 600 can be further decreased.

Figure 8:
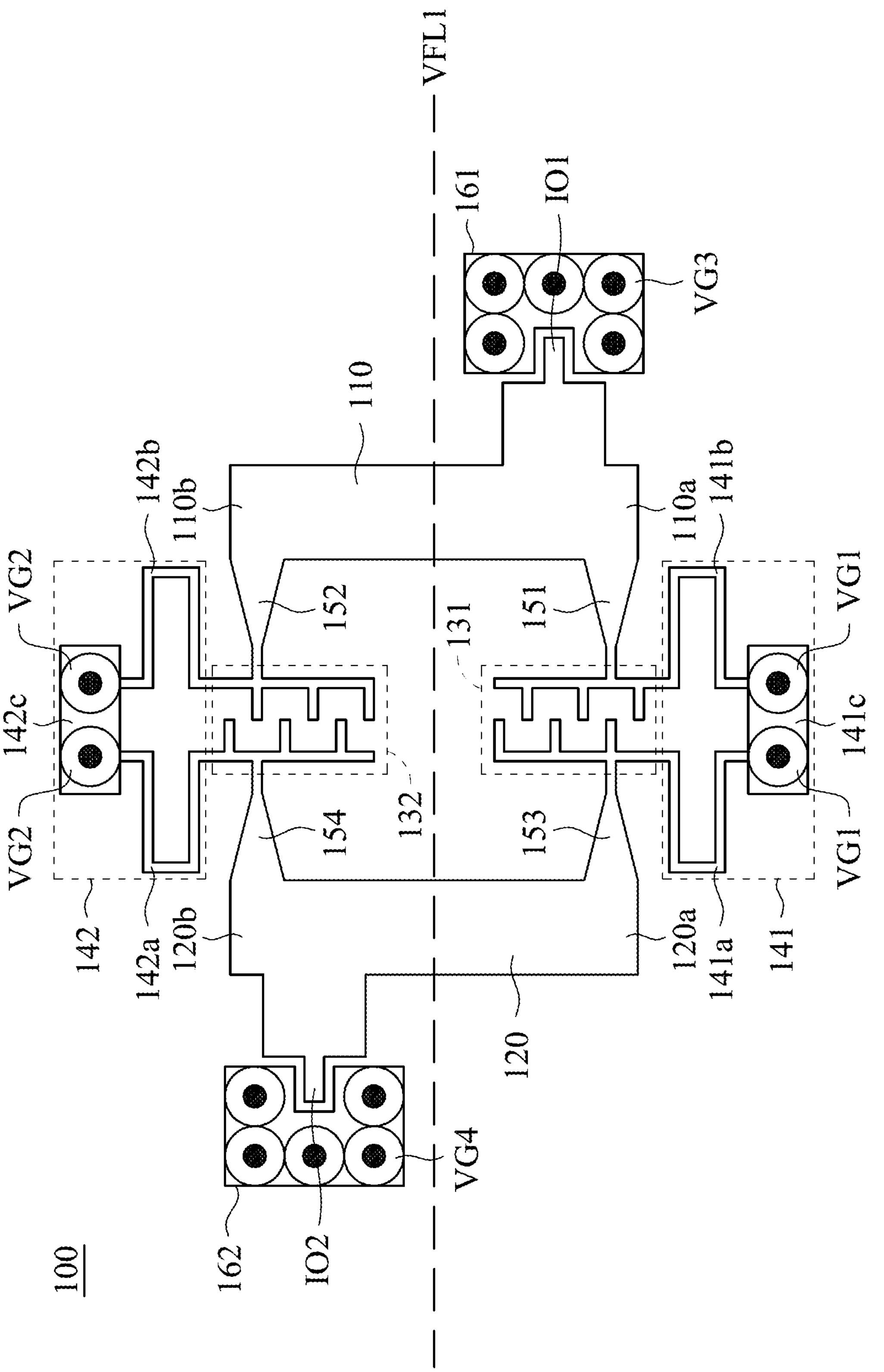
FIG. 8 is a schematic diagram showing a virtual folded line of the multi-band filter in accordance with an embodiment of the present invention.

Referring to FIG. 8, FIG. 8 is a schematic diagram showing a virtual folded line VFL1 of the multi-band filter 100 in accordance with an embodiment of the present invention. The virtual folded line VFL1 is configured to define a folding manner of the multi-band filter 100, and thus the multi-band filter 100 can be bent in accordance with the virtual folded line VFL1. As shown in FIG. 8, the virtual folded line VFL1 is a straight line extended and passing though the first resonator 110 and the second resonator 120, but the virtual folded line VFL1 does not pass through the first coupling capacitor 131 and the second coupling capacitor 132. Therefore, when the multi-band filter 100 is folded (for example, the above case that the antenna module 600 is bent/folded), the multi-band filter 100 can be bent/folded along the virtual folded line VFL1 to satisfy a user's demand for a design of an antenna module. Because the virtual folded line VFL1 does not pass through the first coupling capacitor 131 and the second coupling capacitor 132, the function of the multi-band filter 100 is not affected by the folding/bending of the multi-band filter 100.

Figure 9:
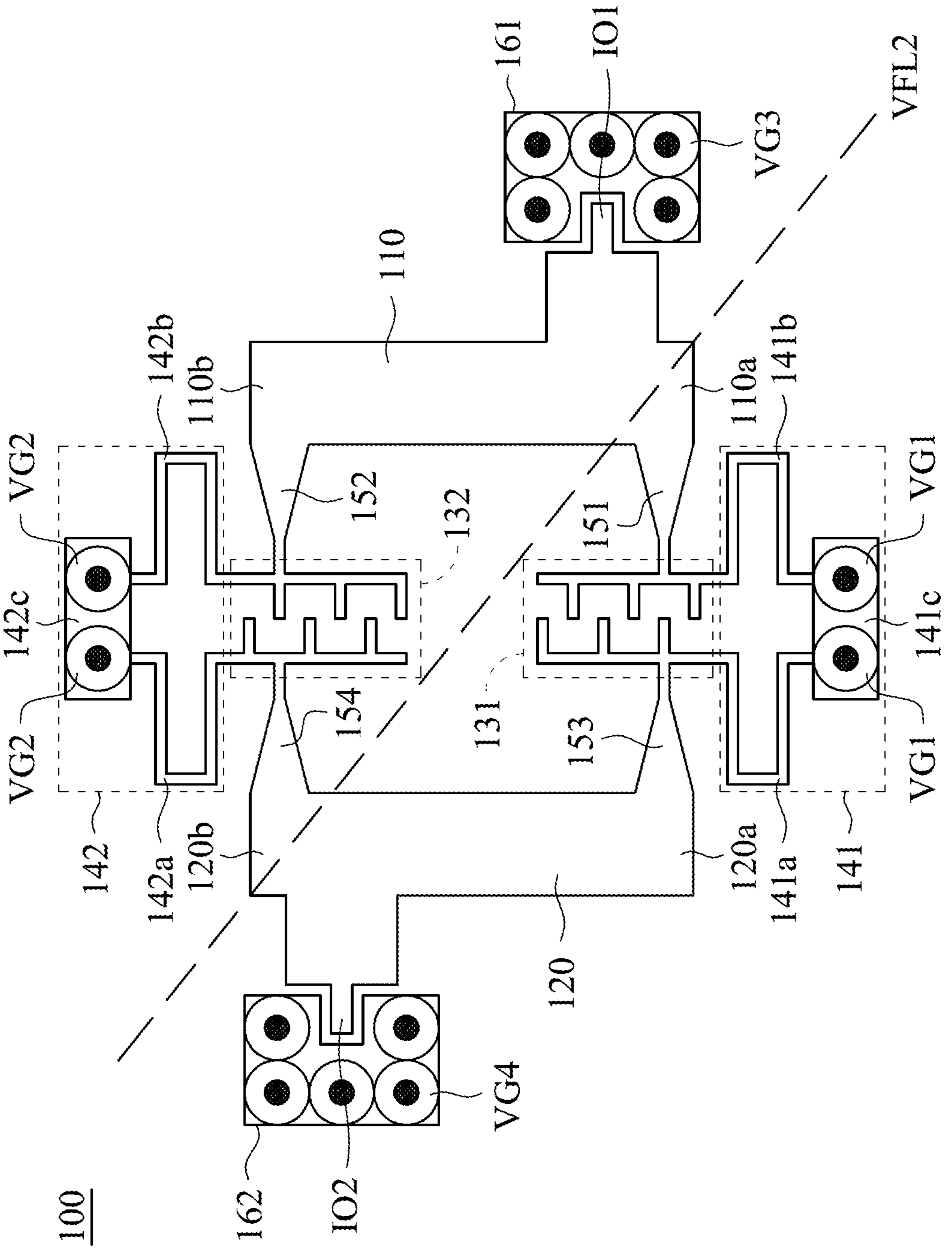
FIG. 9 is a schematic diagram showing another virtual folded line of the multi-band filter in accordance with an embodiment of the present invention.
Figure 10:
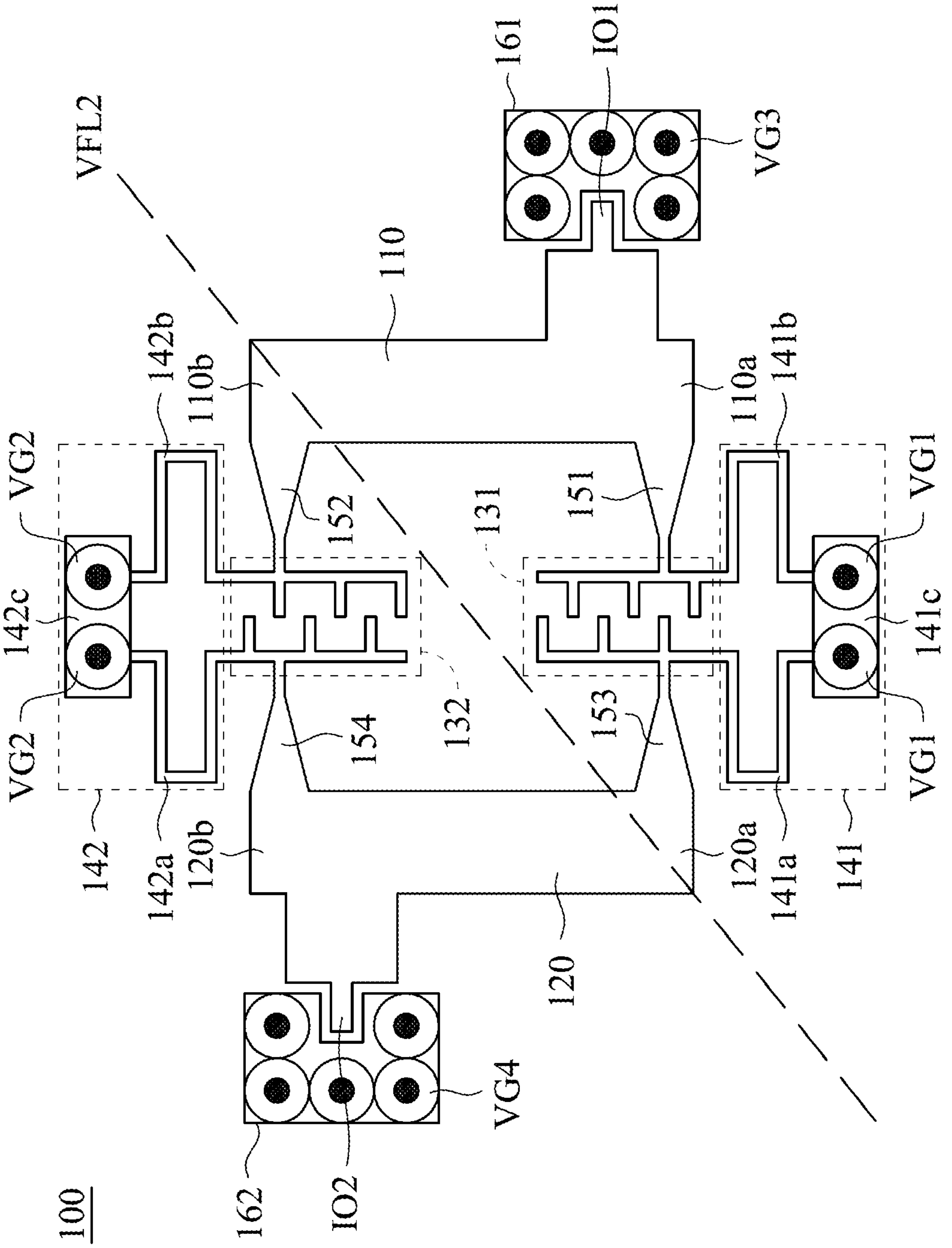
FIG. 10 is a schematic diagram showing another virtual folded line of the multi-band filter in accordance with an embodiment of the present invention.

Referring to FIG. 9, FIG. 9 is a schematic diagram showing a virtual folded line VFL2 of the multi-band filter 100 in accordance with an embodiment of the present invention. The virtual folded line VFL2 is configured to define another folding manner of the multi-band filter 100. As shown in FIG. 9, the virtual folded line VFL2 is a straight line extending through the first resonator 110 and the second resonator 120, but the virtual folded line VFL2 does not pass through the first coupling capacitor 131 and the second coupling capacitor 132. Similar to the horizontal virtual folded line VFL1, the multi-band filter 100 can be bent/folded by using the folding manner defined by the virtual folded line VFL2 to satisfy a user's demand for a design of an antenna module. Further, because the virtual folded line VFL2 does not pass through the first coupling capacitor 131 and the second coupling capacitor 132, the function of the multi-band filter 100 is not affected by the folding/bending of the multi-band filter 100. In some embodiments, the diagonal virtual folded line VFL2 can be arranged in another direction to define the folding manner, as shown in FIG. 10.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A multi-band filter configured to provide a plurality of frequency bands, comprising:
- a circuit board;
- a first resonator having a first portion and an opposite second portion;
- a second resonator having a first portion and an opposite second portion; and
- a coupling element configured to couple the first resonator with the second resonator, wherein the coupling element comprises:
  - a first coupling capacitor disposed between the first portion of the first resonator and the first portion of the second resonator, wherein a terminal of the first coupling capacitor is electrically connected to the first resonator, and another terminal of the first coupling capacitor is electrically connected to the second resonator;
  - a second coupling capacitor disposed between the second portion of the first resonator and the second portion of the second resonator, wherein a terminal of the second coupling capacitor is electrically connected to the first resonator, and another terminal of the second coupling capacitor is electrically connected to the second resonator;
- a first short-circuited stub electrically connected to the first coupling capacitor and a ground plane; and
- a second short-circuited stub electrically connected to the second coupling capacitor and the ground plane;

wherein the first resonator, the second resonator and the coupling element are disposed on the circuit board, and the first coupling capacitor and the second coupling capacitor are interdigital capacitors.

2. The multi-band filter of claim 1, wherein the circuit board is a multi-layer circuit board comprising at least three layers that at least one is grounded layer including the ground plane, and the first coupling capacitor and the second coupling capacitor are respectively disposed in different layers on opposite sides of the grounded layer.

3. The multi-band filter of claim 2, further comprises:
- a first funnel-shaped connecting path disposed between the first resonator and the first coupling capacitor, wherein the first funnel-shaped connecting path has an escalating width, the wider part of the first funnel-shaped connecting path is connected to the first resonator, the narrower part of the first funnel-shaped connecting path is connected to the first coupling capacitor;
- a second funnel-shaped connecting path disposed between the first resonator and the second coupling capacitor, wherein the second funnel-shaped connecting path has an escalating width, the wider part of the second funnel-shaped connecting path is connected to the first resonator, the narrower part of the second funnel-shaped connecting path is connected to the second coupling capacitor;
- a third funnel-shaped connecting path disposed between the second resonator and the first coupling capacitor, wherein the third funnel-shaped connecting path has an escalating width, the wider part of the third funnel-shaped connecting path is connected to the second resonator, the narrower part of the third funnel-shaped connecting path is connected to the first coupling capacitor; and
- a fourth funnel-shaped connecting path disposed between the second resonator and the second coupling capacitor, wherein the fourth funnel-shaped connecting path has an escalating width, the wider part of the fourth funnel-shaped connecting path is connected to the second resonator, the narrower part of the fourth funnel-shaped connecting path is connected to the second coupling capacitor;

wherein
- the first funnel-shaped connecting path, the second funnel-shaped connecting path, the third funnel-shaped connecting path and the fourth funnel-shaped connecting path are disposed on the circuit board;
- the multi-layer circuit board comprises a first circuit layer, a second circuit layer and a third circuit layer, where the second circuit layer is located between the first circuit layer and the third circuit layer;
- the first portion of the first resonator is arranged in the first circuit layer, and the second portion of the first resonator is arranged in the third circuit layer;
- the first portion of the second resonator is arranged in the first circuit layer, and the second portion of the second resonator is arranged in the third circuit layer;

the first funnel-shaped connecting path and the third funnel-shaped connecting path are arranged in the first circuit layer;

the second funnel-shaped connecting path and the fourth funnel-shaped connecting path are arranged in the third circuit layer;

the first coupling capacitor and the first short-circuited stub are arranged in the first circuit layer, and the first coupling capacitor is electrically connected to the first portion of the first resonator and the first portion of the second resonator through the first funnel-shaped connecting path and the third funnel-shaped connecting path; and the second coupling capacitor and the second short-circuited stub are arranged in the third circuit layer, and the second coupling capacitor is electrically connected to the second portion of the first resonator and the second portion of the second resonator through the second funnel-shaped connecting path and the fourth funnel-shaped connecting path.

4. The multi-band filter of claim 3, wherein a number of fingers in each of the interdigital capacitors is 6, and the length of each of the fingers is 140 um.

5. The multi-band filter of claim 4, wherein the first short-circuited stub and the second short-circuited stub have bending portions.

6. The multi-band filter of claim 4, wherein the first resonator and the second resonator are half-wave resonators.

7. The multi-band filter of claim 4, wherein material of the substrate of the multi-layer circuit board is liquid crystal polymer (LCP), the circuit board is foldable in accordance with a virtual folding line, and the virtual folding line extends passing through the first resonator and the second resonator without passing through the first coupling capacitor and the second coupling capacitor.

8. The multi-band filter of claim 4, wherein the first short-circuited stub and the second short-circuited stub are electrically connected to the grounded layer together.

9. The multi-band filter of claim 1, further comprises:

a first funnel-shaped connecting path disposed between the first resonator and the first coupling capacitor, wherein the first funnel-shaped connecting path has an escalating width, the wider part of the first funnel-shaped connecting path is connected to the first resonator, the narrower part of the first funnel-shaped connecting path is connected to the first coupling capacitor;

a second funnel-shaped connecting path disposed between the first resonator and the second coupling capacitor, wherein the second funnel-shaped connecting path has an escalating width, the wider part of the second funnel-shaped connecting path is connected to the first resonator, the narrower part of the second funnel-shaped connecting path is connected to the second coupling capacitor;

a third funnel-shaped connecting path disposed between the second resonator and the first coupling capacitor, wherein the third funnel-shaped connecting path has an escalating width, the wider part of the third funnel-shaped connecting path is connected to the second resonator, the narrower part of the third funnel-shaped connecting path is connected to the first coupling capacitor; and a fourth funnel-shaped connecting path disposed between the second resonator and the second coupling capacitor, wherein the fourth funnel-shaped connecting path has an escalating width, the wider part of the fourth funnel-shaped connecting path is connected to the second resonator, the narrower part of the fourth funnel-shaped connecting path is connected to the second coupling capacitor;

wherein the first funnel-shaped connecting path, the second funnel-shaped connecting path, the third funnel-shaped connecting path and the fourth funnel-shaped connecting path are disposed on the circuit board.

10. The multi-band filter of claim 9, wherein a number of fingers in each of the interdigital capacitors is 6, and the length of each of the fingers is 135 um.

11. The multi-band filter of claim 10, wherein the first short-circuited stub and the second short-circuited stub have bending portions.

12. The multi-band filter of claim 10, wherein the first resonator and the second resonator are half-wave resonators.

13. The multi-band filter of claim 10, wherein material of the substrate of the circuit board is liquid crystal polymer (LCP), the circuit board is foldable in accordance with a virtual folding line, and the virtual folding line extends passing through the first resonator and the second resonator without passing through the first coupling capacitor and the second coupling capacitor.

14. The multi-band filter of claim 1, wherein the first resonator has a first I/O terminal, the second resonator has a second I/O terminal, the multi-band filter further comprises:

a first U-shaped grounded pattern surrounding the first I/O terminal; and a second U-shaped grounded pattern surrounding the second I/O terminal.

15. A multi-band filter, comprising:

a circuit board comprising a grounded layer;

a first resonator having a first portion and an opposite second portion;

a second resonator having a first portion and an opposite second portion;

a first interdigital capacitor and a second interdigital capacitor disposed between the first resonator and the second resonator, wherein the first interdigital capacitor and the second interdigital capacitor are configured to couple the first resonator and the second resonator;

a first short-circuited stub electrically connected to the first interdigital capacitor;

a second short-circuited stub electrically connected to the second interdigital capacitor; and wherein the first resonator, the second resonator, the first interdigital capacitor, the second interdigital capacitor, the first short-circuited stub and the second short-circuited stub are disposed on the circuit board, and the first short-circuited stub and the second short-circuited stub are electrically connected to the grounded layer together through a plurality of vias.

* * * * *